(12) United States Patent
Berwanger

(10) Patent No.: US 9,121,463 B2
(45) Date of Patent: Sep. 1, 2015

(54) NESTED COMPOSITE BRAKE DRUM

(71) Applicant: Bendix Spicer Foundation Brake LLC, Elyria, OH (US)

(72) Inventor: Fred W. Berwanger, Edwardsburg, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 139 days.

(21) Appl. No.: 13/687,621

(22) Filed: Nov. 28, 2012

(65) Prior Publication Data

US 2014/0144735 A1    May 29, 2014

(51) Int. Cl.
    *F16D 65/10*        (2006.01)
    *F16D 65/02*        (2006.01)

(52) U.S. Cl.
    CPC .......... *F16D 65/10* (2013.01); *F16D 2065/132* (2013.01); *F16D 2065/1316* (2013.01); *F16D 2200/003* (2013.01); *F16D 2200/0013* (2013.01); *F16D 2200/0047* (2013.01); *F16D 2250/0084* (2013.01); *Y10T 29/49865* (2013.01)

(58) Field of Classification Search
    CPC ............ F16D 65/10; F16D 2065/1316; F16D 2065/132; F16D 2200/0013; F16D 2200/0047; F16D 2200/003
See application file for complete search history.

(56) References Cited

U.S. PATENT DOCUMENTS

| | | | | |
|---|---|---|---|---|
| 1,746,494 A | * | 2/1930 | Norton ....................... | 188/218 R |
| 1,998,709 A | | 4/1935 | Dake | |
| 2,173,591 A | * | 9/1939 | Miller ....................... | 188/218 R |
| 2,702,613 A | * | 2/1955 | Walther ..................... | 188/218 R |
| 3,035,667 A | * | 5/1962 | Malthaner ................. | 188/218 R |
| 3,323,620 A | * | 6/1967 | Klauer et al. ............. | 188/218 R |
| 3,332,774 A | * | 7/1967 | Tuttle ................................ | 419/8 |
| 3,343,927 A | * | 9/1967 | Brede, III ................ | 188/218 A |
| 3,370,947 A | * | 2/1968 | Talmage ............................ | 419/8 |
| 3,401,026 A | | 9/1968 | Walker et al. | |
| 3,583,533 A | | 6/1971 | Jones, Jr. et al. | |
| 4,262,407 A | | 4/1981 | Petersen et al. | |
| 4,436,139 A | | 3/1984 | Strader | |
| 5,782,324 A | * | 7/1998 | Wall ......................... | 188/218 R |

(Continued)

FOREIGN PATENT DOCUMENTS

| | | |
|---|---|---|
| DE | 10120326 A1 | 11/2002 |
| WO | 2012052647 A1 | 4/2012 |

OTHER PUBLICATIONS

Stemco LP, "Genuine CentriFuse Quality Lightweight Brake Drums," (6 pages).

(Continued)

*Primary Examiner* — Thomas Irvin
(74) *Attorney, Agent, or Firm* — Reising Ethington P.C.

(57) ABSTRACT

A brake drum is provided having an inner drum defining an outboard, radially inwardly extending flange. The flange defines a first plurality of apertures configured to receive fasteners for coupling the inner drum to a wheel. The inner drum further defines a braking surface. The brake drum further includes an outer drum configured to receive the inner drum therein. The outer drum defines an outboard, radially inwardly extending flange defining a second plurality of apertures aligned with the first plurality of apertures and configured to receive the fasteners for coupling the outer drum to the wheel. The inner drum is comprised of a first material such as iron while the outer drum is comprised of a second material such as aluminum.

11 Claims, 2 Drawing Sheets

(56) References Cited

U.S. PATENT DOCUMENTS

| | | | |
|---|---|---|---|
| 5,826,684 A | | 10/1998 | Hester |
| 5,927,447 A | | 7/1999 | Dickerson |
| 5,975,256 A | * | 11/1999 | Kondoh et al. .......... 188/251 M |
| 6,196,363 B1 | | 3/2001 | Wall |
| 6,241,056 B1 | | 6/2001 | Cullen et al. |
| 6,530,458 B1 | * | 3/2003 | Rau, III ..................... 188/218 R |
| 6,572,712 B2 | * | 6/2003 | Powell et al. ................. 148/321 |
| 6,601,284 B1 | * | 8/2003 | Wall ............................. 29/527.5 |
| 7,216,746 B2 | * | 5/2007 | Yamamoto et al. ....... 188/218 R |
| 8,181,753 B2 | * | 5/2012 | Levering et al. .......... 188/218 R |
| 2002/0108823 A1 | | 8/2002 | Powell et al. |
| 2004/0011607 A1 | * | 1/2004 | Jenkinson ................. 188/218 R |
| 2005/0217950 A1 | * | 10/2005 | Jolley et al. ............... 188/218 R |
| 2006/0027429 A1 | * | 2/2006 | Knight et al. ................... 188/74 |
| 2008/0210504 A1 | * | 9/2008 | Levering et al. .......... 188/218 R |
| 2009/0065313 A1 | * | 3/2009 | Levering ................... 188/218 R |
| 2010/0018819 A1 | * | 1/2010 | Dessouki et al. ............. 188/325 |
| 2010/0140033 A1 | * | 6/2010 | Monsere et al. ............. 188/381 |
| 2011/0061830 A1 | | 3/2011 | Wood et al. |
| 2012/0037466 A1 | * | 2/2012 | Lee et al. .................. 188/218 R |

OTHER PUBLICATIONS

International Search Report Issued in corresponding International (PCT) Patent Application No. PCT/US2013/064234 (Jan. 3, 2014).
Written Opinion issued in corresponding International (PCT) Patent Application No. PCT/US2013/064234 (Jan. 3, 2014).

* cited by examiner

NESTED COMPOSITE BRAKE DRUM

BACKGROUND OF THE INVENTION a. Field of the Invention

This invention relates to brake drums. In particular, the invention relates to a brake drum having nested inner and outer brake drums made from different materials to take advantage of different material properties.

b. Background Art

A conventional drum brake includes a brake drum that rotates with a wheel or wheels proximate to one end of an axle. The drum defines a radially inner braking surface. A brake spider is disposed about the axle and a pair of brake shoes are pivotally mounted at one end to the brake spider. The opposite end of each brake shoe is engaged by an actuating member such as a cam or hydraulic piston or wedge to move the brake shoes between positions of engagement and disengagement with the braking surface of the brake drum.

Conventional brake drums have a number of drawbacks. First, conventional brake drums often contribute to brake fade. Brake fade occurs when the brake actuator nears the furthest extent of its possible travel. In this situation, the force output of the brake actuator decreases as well as the resulting brake torque. Conventional brake drums are subject to ovalization which causes the brake actuator to travel further in order to maintain contact between the brake shoes and brake drum while also creating non-uniform contact with the brake linings. Conventional brake drums also retain excessive heat resulting in thermal expansion of the drum and requiring further travel of the actuator. Excessive temperatures also reduce the friction of brake lining materials, further contributing to brake fade.

Second, various portions of conventional brake drums heat and cool at different rates. This causes thermal stress on the drum which, along with mechanical stress, leads to cracks in the wall of the brake drum.

Third, conventional brake drums have sections that are relatively thick. When the braking friction surface of such a section is heated rapidly, its expansion is constrained by cooler portions of the section causing the warmer surface to yield in compression. When the section cools to a more uniform temperature, contraction of the formerly warm surface is again constrained by the remainder of the section causing the generation of surface cracks. The constrained expansion and contraction of the friction surface in conventional brake drums leads to shallow surface cracks or "heat checks."

Fourth, conventional brake drums are relatively heavy. Most conventional brake drums are machined from gray iron castings. Graphite flakes in gray iron provide material damping and provide relatively stable friction and wear properties, but graphite flakes have planar discontinuities that result in low strength, brittleness and low stiffness. As a result, a relatively heavy design weight is required for gray iron brake drums. Further, conventional brake drums require a relatively large mass to act as a heat sink and control the temperature of the brake and surrounding structures. Materials including ductile iron, vermicular compacted graphite iron, steel, aluminum and aluminum matrix composites have been used in brake drums in an effort to overcome these deficiencies, but each of these materials have their own disadvantages in terms of poor friction and wear properties, low material damping and stiffness, high thermal stress and low strength.

The inventor herein has recognized a need for a brake drum that will minimize and/or eliminate one or more of the above-identified deficiencies.

BRIEF SUMMARY OF THE INVENTION

The present invention relates to brake drums. In particular, the invention relates to a brake drum having nested inner and outer brake drums made from different materials to take advantage of different material properties.

A brake drum in accordance with one embodiment of the present invention includes an inner drum. The inner drum defines an outboard, radially inwardly extending flange defining a first plurality of apertures configured to receive fasteners for coupling the inner drum to a wheel. The inner drum also defines a braking surface. The inner drum is comprised of a first material. The brake drum further includes an outer drum configured to receive the inner drum therein. The outer drum defines an outboard, radially inwardly extending flange defining a second plurality of apertures aligned with the first plurality of apertures and configured to receive the fasteners for coupling the outer drum to the wheel. The outer drum is comprised of a second material.

A brake drum in accordance with another embodiment of the present invention includes an inner drum defining a braking surface. The inner drum comprises iron. The brake drum further includes an outer drum comprising aluminum. The outer drum is configured to receive the inner drum therein and is engaged with the inner drum in an interference fit such that the inner drum may be removed and replaced with a replacement inner drum.

A method of manufacturing a brake drum in accordance with one embodiment of the present invention includes the steps of forming an outer drum of a first material and forming an inner drum of a second material. The inner drum defines a braking surface. The method further includes the steps of heating the outer drum and inserting the inner drum into the outer drum whereby the outer drum and the inner drum engage in an interference fit upon cooling of the outer drum.

A brake drum in accordance with the present invention represents an improvement relative to conventional brake drums. The use of different materials for the outer and inner drum enables the drum to take advantage of the different properties of the different materials. For example, in certain embodiments of the invention, the outer drum is made from aluminum with an outboard flange made from a metal matrix composite material. The composite material helps to resist ovalization of the drum while the aluminum provides an effective heat sink to reduce the temperature of the brake drum thereby reducing brake fade. The non-bonded interface between the inner and outer drums provides relief from thermal stress thereby reducing cracks in the wall of the brake drum. The use of two relatively thin drums as opposed to a single thick drum of a single material further reduces thermal stress and heat checks. Finally, the use of multiple drums of different materials allows the use of relatively low weight materials for portions of the brake drum.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
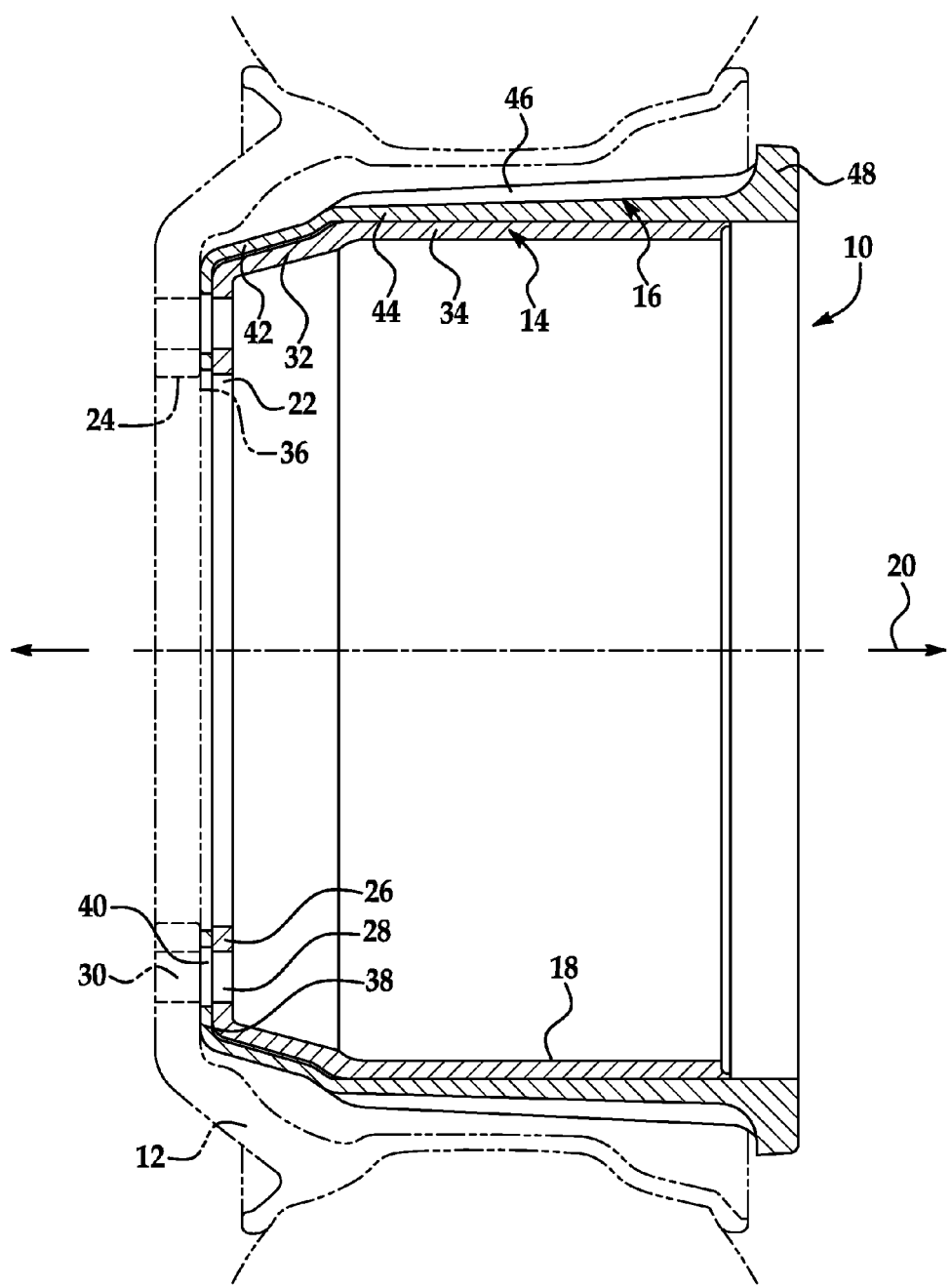
FIG. 1 is a cross-sectional view of a brake drum in accordance with one embodiment of the present invention.

Referring now to the drawings wherein like reference numerals are used to identify identical components in the various views, FIG. 1 illustrates a brake drum 10 cross-section in accordance with one embodiment of the present invention mounted to a conventional wheel 12. Drum 10 is particularly adapted for use in heavy trucks. It should be understood, however, that drum 10 may be used on a wide variety of vehicles and in non-vehicular applications. Drum 10 may include an inner drum 14 and an outer drum 16 made from different materials in accordance with one aspect of the present invention.

Inner drum 14 defines a braking surface 18 on a radially inward side that may be selectively engaged by brake linings on conventional brake shoes that are moved into and out of engagement with drum 14 by a conventional brake actuator. In accordance with one aspect of the invention, drum 14 may be made from iron and, in particular, vermicular graphite iron. The use of vermicular graphite iron provides friction and wear properties compatible with conventional brake lining materials. It also provides material damping of low-displacement vibrations, torque transmission to wheel 12 and thermal isolation from wheel 12.

Drum 14 is annular and configured for rotation with wheel 12 about a central axis 20. Drum 14 defines a central aperture 22 centered about axis 20 and aligned with a corresponding aperture 24 in wheel 12. Apertures 22, 24 are configured to receive one end of an axle (not shown) disposed about axis 20. Drum 14 further defines a radially inwardly extending flange 26 at an outboard end of drum 14. Flange 26 defines a plurality of apertures 28 that are aligned with corresponding apertures 30 in wheel 12 and configured to receive fasteners such as bolts for coupling drum 14 to and associated wheel 12 and hub (not shown). Drum 14 includes a bridge section 32 extending between flange 26 and an inboard section 34 that defines surface 18. The inner and outer diameters of bridge section 32 may increase moving from flange 26 to inboard section 34 (i.e. drum 14 widens moving from flange 26 to section 34) and may increase at the same rate such that the width of section 32 remains constant throughout its length. The inner and outer diameters of section 34 may be constant over the length of section 34 and the width of section 34 may also remain constant throughout its length.

Outer drum 16 provides a means for transferring heat away from inner drum 14, resisting ovalization of drum 10 and relieving thermal stress on drum 10. In accordance with one aspect of the invention, drum 16 may be made from aluminum. The use of aluminum in drum 16 is advantageous because it is relatively lightweight and provides an effective heat sink due to its high specific heat and high thermal conductivity. Drum 16 is sized to receive inner drum 14 and a radially inner surface of drum 16 is shaped complementary to a radially outer surface of drum 14. The interface between drums 14, 16 and the use of different materials for drums 14, 16 provides relief from thermal stress and Coulomb damping (dissipation of energy through sliding fiction) of higher-displacement vibrations.

Drum 16 is annular and configured for rotation with wheel 12 and inner drum 14 about axis 20. Drum 16 defines a central aperture 36 aligned with aperture 24 in wheel 12 and aperture 22 in drum 14 and configured to receive one end of an axle (not shown) disposed about axis 20. Drum 16 defines a radially inwardly extending flange 38 at an outboard end of drum 16. Flange 38 defines a plurality apertures 40 that are aligned with apertures 30 in wheel 12 and apertures 28 in drum 14 and that are configured to receive fasteners such as bolts for coupling drum 16 to wheel 12 and drum 14. Flange 38 has sufficient strength to resist transient vibration-induced loads. Drum 16 includes a bridge section 42 extending between flange 38 and a central section 44 and disposed radially outwardly of bridge section 32 in inner drum 14. The inner and outer diameters of bridge section 42 may increase moving from flange 38 to central section 44 (i.e. drum 16 widens moving from flange 38 to section 44) and may increase at the same rate such that the width of section 42 remains constant throughout its length. Although the inner diameter of section 44 may remain constant over the length of section 44, the outer diameter of section 44 may increase moving in an inboard direction such that the width or thickness of section 44 of drum 16 narrows moving from an inboard end of drum 16 towards an outboard end of drum 16. This configuration helps to direct conduction of heat outboard towards the exposed end of the drum 10, rather than inboards towards wheel 12. Section 44 may also define a plurality of radially outwardly extending fins 46 that increase in radial height moving away from the outboard end of drum 16 and towards the exposed inboard end of drum 16. Fins 46 aid convection of heat from drum 10 to the atmosphere.

Drum 16 defines a radially outwardly extending flange 48 at an inboard end. Flange 48 may be relatively thick and, in particular, thicker than section 42 of drum 16. In accordance with one aspect of the present invention, flange 48 may be made from a metal matrix composite material. In particular, flange 48 may be made from aluminum and ceramic. The form and material composition of flange 48 provide increased stiffness to drum 10 which resists ovalization of both inner drum 14 and outer drum 16. The lower conductivity and sensitivity to thermal stress of flange 48 relative to the remainder of drum 16 is mitigated by the distance of flange 48 from braking surface 18.

Figure 2:
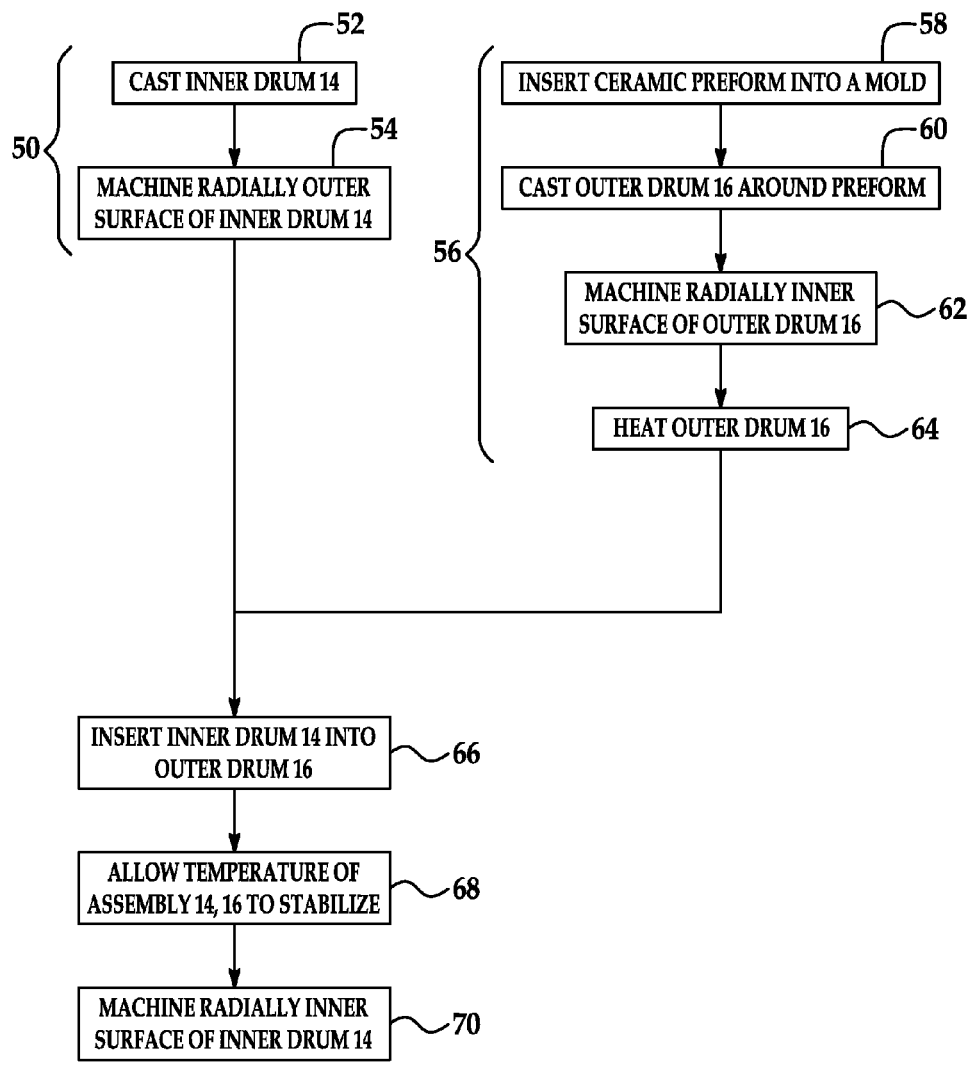
FIG. 2 is a flow chart illustrating method for manufacturing a brake drum in accordance with one embodiment of the present invention.

Referring now to FIG. 2, a method of manufacturing a brake drum 10 in accordance with one embodiment of the present invention will be described. The method may begin with the step 50 of forming an inner drum 14. As discussed above, the inner drum 14 may be made from iron and particularly vermicular graphite iron and defines a braking surface 18. Step 50 may include the substeps 52, 54 of casting drum 14 (and specifically, spin casting drum 14) and machining the radially outer surface of drum 14. The method may also include the step 56 of forming an outer drum 16. As discussed hereinabove, drum 16 may be made from aluminum with an outboard flange 48 made from a metal matrix composite. Step 56 may include the substep 58 of inserting a porous ceramic preform into a mold. Step 56 may further include the substep 60 casting drum 16 around the preform such that the preform is located in a radially outwardly extending flange 48 at the inboard end of drum 16. High pressure die casting or squeeze casting may be used in substep 60 to allow the aluminum to infiltrate the ceramic preform. Step 56 may further include the substep 62 of machining a radially inner surface of drum 16. Drum 10 may then be anodized to increase corrosion and wear resistance. As illustrated in FIG. 2, steps 50 and 56 (and their associated substeps) may be performed concurrently or simultaneously. It should be understood, however, that the steps 50 and 56 (and their associated substeps) may alternatively be performed in succession.

The method may continue with the step 64 of heating outer drum 16 to permit thermal expansion of drum 16. The method may then include the step 66 of inserting drum 14 into drum 16. Step 66 may include the substep of aligning apertures 28 in flange 26 of drum 14 with apertures 40 in flange 38 of drum 16. The method may then include the step 68 of cooling outer drum 16 such that outer drum 16 contracts and inner and outer drums 14, 16 engage in an interference fit. Cooling may take place through natural, passive heat dissipation from drum 16 or through active enhancement of the cooling process. The size of drums 14, 16 and the high thermal expansion coefficient of aluminum in drum 16 allows the drums 14, 16 to be shrunk-fit together with low residual stress. Drums 14, 16 are not permanently bonded and during high operating temperatures, a slight clearance may open between the cylindrical sections of drums 14, 16 while the brake is released. In accordance with one aspect of the present invention, outer drum 16 can be reheated to allow removal and replacement of drum 14 with a replacement inner drum when wear occurs. The method may conclude with the step 70 of machining the radially inner surface of inner drum 14 including braking surface 18.

A brake drum 10 in accordance with the present invention represents an improvement relative to conventional brake drums. The use of different materials for the inner and outer drums 14, 16 enables the drum 10 to take advantage of the different properties of the different materials. For example, in certain embodiments of the invention, the outer drum 16 is made from aluminum with an inboard flange 48 made from a metal matrix composite material. The composite material helps to resist ovalization of the drum 10 while the aluminum provides an effective heat sink to reduce the temperature of the brake drum 10 thereby reducing brake fade. The interface between the inner and outer drums 14, 16 provides vibration damping and relief from thermal stress thereby reducing cracks in the wall of the brake drum. The use of two relatively thin drums 14, 16 as opposed to a single thick drum of a single material further reduces thermal stress and heat checks. The use of multiple drums 14, 16 of different materials also allows the use of relatively low weight materials for the brake drum 10. Finally, the non-bonded, interference fit between drums 14, 16 permits removal and replacement of inner drum 14 when wear occurs.

While the invention has been shown and described with reference to one or more particular embodiments thereof, it will be understood by those of skill in the art that various changes and modifications can be made without departing from the spirit and scope of the invention.

What is claimed is:

1. A wheel and brake drum assembly, comprising:
   a wheel disposed about a central axis and defining a first plurality of apertures;
   an inner drum defining an outboard, radially inwardly extending flange defining a second plurality of apertures aligned with said first plurality of apertures and configured to receive fasteners for coupling said inner drum to said wheel and defining a braking surface, said inner drum comprised of a first material; and,
   an outer drum configured to receive said inner drum therein, said outer drum defining an outboard, radially inwardly extending flange defining a third plurality of apertures aligned with said first and second pluralities of apertures and configured to receive said fasteners for coupling said outer drum to said wheel, said outer drum comprised of a second material;
   wherein said outer drum engages said inner drum in an interference fit such that said inner drum may be removed and replaced with a replacement inner drum.

2. The wheel and brake drum assembly of claim 1 wherein said first material comprises iron.

3. The wheel and brake drum assembly of claim 2 wherein said first material comprises vermicular graphite iron.

4. The wheel and brake drum assembly of claim 2 wherein said second material comprises aluminum.

5. The wheel and brake drum assembly of claim 1 wherein said second material comprises aluminum.

6. The wheel and brake drum assembly of claim 1 wherein said outer drum defines an inboard, radially outwardly extending flange, said radially outwardly extending flange comprising a metal matrix composite material.

7. The wheel and brake drum assembly of claim 6 wherein said metal matrix composite material includes aluminum and a ceramic.

8. The wheel and brake drum assembly of claim 1 wherein a thickness of said outer drum narrows moving from an inboard end of said outer drum towards an outboard end of said outer drum.

9. A brake drum, comprising:
   an inner drum defining a braking surface, said inner drum comprising iron; and, an outer drum comprising aluminum and configured to receive said inner drum therein and engaged with said inner drum in an interference fit such that said inner drum may be removed and replaced with a replacement inner drum,
   wherein said outer drum defines an inboard, radially outwardly extending flange, an entirety of said radially outwardly extending flange comprising a metal matrix composite material.

10. The brake drum of claim 9 wherein said iron comprises vermicular graphite iron.

11. The brake drum of claim 9 wherein said metal matrix composite material includes aluminum and a ceramic.

\* \* \* \* \*